United States Patent
Viscito et al.

(10) Patent No.: US 8,160,153 B2
(45) Date of Patent: Apr. 17, 2012

(54) HYPOTHETICAL REFERENCE DECODER WITH LOW START-UP DELAYS FOR COMPRESSED IMAGE AND VIDEO

(75) Inventors: Eric Viscito, San Francisco, CA (US); Dzung T. Hoang, San Jose, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 487 days.

(21) Appl. No.: 12/384,180

(22) Filed: Mar. 31, 2009

(65) Prior Publication Data
US 2009/0190666 A1    Jul. 30, 2009

Related U.S. Application Data

(63) Continuation of application No. 10/655,698, filed on Sep. 5, 2003, now Pat. No. 7,532,670, which is a continuation-in-part of application No. 10/600,163, filed on Jun. 19, 2003, now Pat. No. 7,257,162.

(60) Provisional application No. 60/393,665, filed on Jul. 2, 2002.

(51) Int. Cl.
*H04N 7/12* (2006.01)
(52) U.S. Cl. .......... 375/240.25; 375/240.01; 375/240.12
(58) Field of Classification Search ............ 375/240, 375/240.01, 240.12, 240.25
See application file for complete search history.

(56) References Cited

U.S. PATENT DOCUMENTS

| | | | |
|---|---|---|---|
| 5,481,543 A | 1/1996 | Veltman |
| 5,929,916 A | 7/1999 | Legall et al. |
| 6,115,072 A | 9/2000 | Vuong et al. |
| 6,151,359 A | 11/2000 | Acer et al. |
| 6,285,825 B1 | 9/2001 | Miwa et al. |

FOREIGN PATENT DOCUMENTS

| | | |
|---|---|---|
| GB | 2309611 | 7/1997 |
| WO | WO 2004/006446 A2 | 1/2004 |

OTHER PUBLICATIONS

"Joint Committee Draft"; 3$^{rd}$ Meeting Fairfax, Virginia, USA May 6-10, 2002. pp. 1-18.

*Primary Examiner* — Allen Wong
(74) *Attorney, Agent, or Firm* — Farjami & Farjami LLP

(57) ABSTRACT

In one aspect, a method for encoding pictures is provided. The method is applied to each picture in a sequence of pictures, and the method comprises the steps of assigning a pre-decoder buffer removal time to the picture; selecting, for the picture, a number of bits, wherein the time-equivalent of the number of bits is no greater than a difference based on the pre-decoder buffer removal time of the picture and an initial arrival time of the picture into a pre-decoder buffer; and compressing the picture to generate the number of bits. The method may further include the step of allocating a first number of bits for compressing the picture and one or more number of bits for compressing one or more future pictures, wherein the future pictures are in the pre-decoder buffer at the pre-decoder buffer removal time of the current picture.

27 Claims, 7 Drawing Sheets

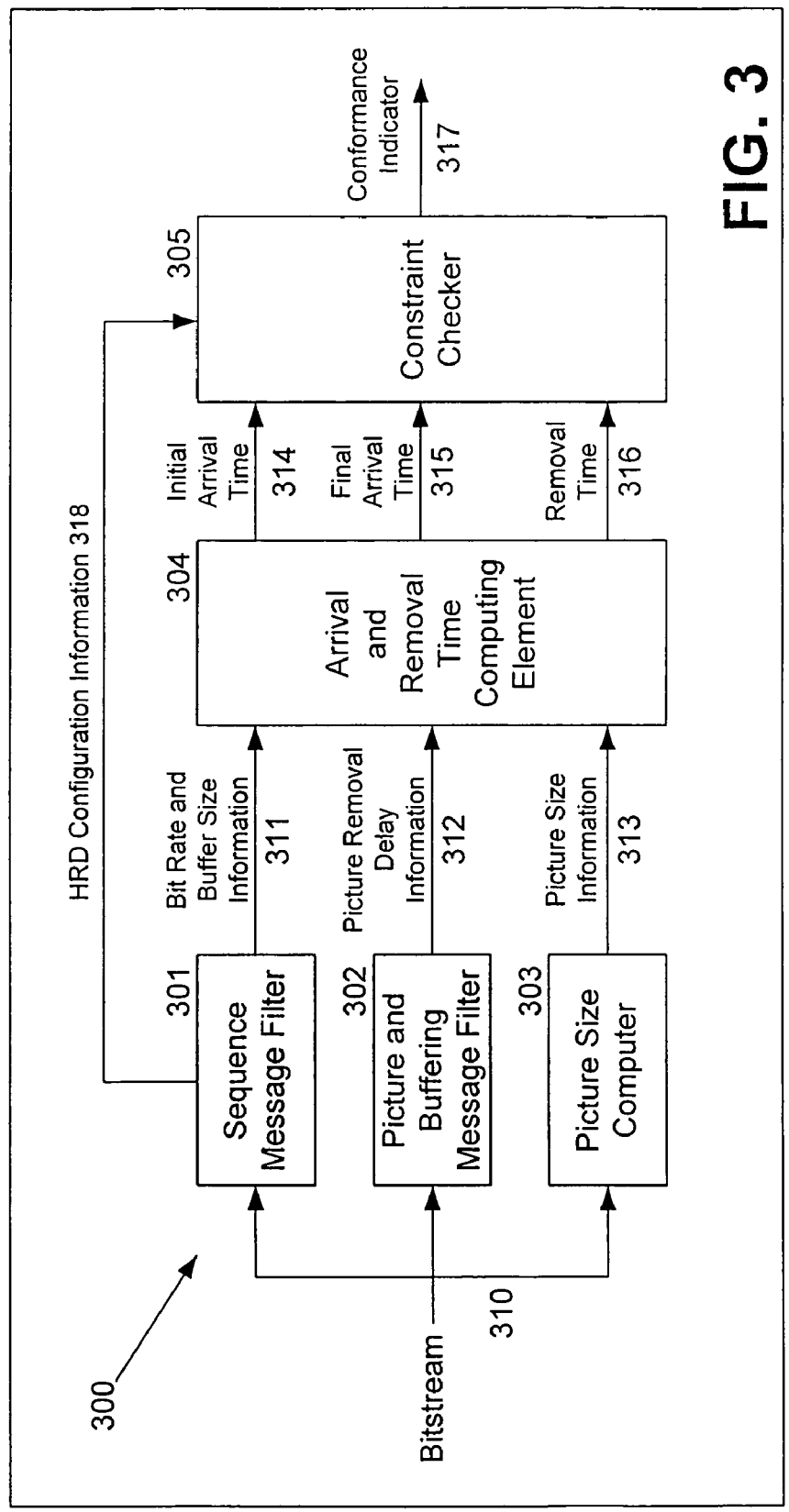

500

| Attribute | Value | Units |
|---|---|---|
| time_scale | 1 | units per second |
| num_units_in_tick | 1 | units per tick |
| $R$ | 1000 | bits per second |
| $B$ | 10 | bits |
| $T$ | 10 | seconds |

| b | $t_e$ | $t_{ai}$ | $t_{af}$ | $t_{ai}-t_e$ | $t_r$ | $t_r - t_{ai}$ | $t_r - t_e$ |
|---|---|---|---|---|---|---|---|
| 5,000 | 0 | 0 | 5 | 0 | 10 | 10 | 10 |
| 1,000 | 1 | 5 | 6 | 4 | 11 | 6 | 10 |
| 1,000 | 2 | 6 | 7 | 4 | 12 | 6 | 10 |
| 1,000 | 3 | 7 | 8 | 4 | 13 | 6 | 10 |
| 1,000 | 4 | 8 | 9 | 4 | 14 | 6 | 10 |
| 1,000 | 5 | 9 | 10 | 4 | 15 | 6 | 10 |
| 500 | 6 | 10 | 10.5 | 4 | 16 | 6 | 10 |
| 500 | 7 | 10.5 | 11 | 3.5 | 17 | 6.5 | 10 |
| 500 | 8 | 11 | 11.5 | 3 | 18 | 7 | 10 |
| 500 | 9 | 11.5 | 12 | 2.5 | 19 | 7.5 | 10 |
| 500 | 10 | 12 | 12.5 | 2 | 20 | 8 | 10 |
| 500 | 11 | 12.5 | 13 | 1.5 | 21 | 8.5 | 10 |
| 500 | 12 | 13 | 13.5 | 1 | 22 | 9 | 10 |
| 500 | 13 | 13.5 | 14 | 0.5 | 23 | 9.5 | 10 |
| 500 | 14 | 14 | 14.5 | 0 | 24 | 10 | 10 |
| 500 | 15 | 15 | 15.5 | 0 | 25 | 10 | 10 |
| 500 | 16 | 16 | 16.5 | 0 | 26 | 10 | 10 |
| 500 | 17 | 17 | 17.5 | 0 | 27 | 10 | 10 |
| 3,000 | 18 | 18 | 21 | 0 | 28 | 10 | 10 |
| 3,000 | 19 | 21 | 24 | 2 | 29 | 8 | 10 |
| 3,000 | 20 | 24 | 27 | 4 | 30 | 6 | 10 |
| 3,000 | 21 | 27 | 30 | 6 | 31 | 4 | 10 |
| 2,000 | 22 | 30 | 32 | 8 | 32 | 2 | 10 |
| 300 | 23 | 32 | 32.3 | 9 | 33 | 1 | 10 |
| 300 | 24 | 32.3 | 32.6 | 8.3 | 34 | 1.7 | 10 |
| 300 | 25 | 32.6 | 32.9 | 7.6 | 35 | 2.4 | 10 |
| 300 | 26 | 32.9 | 33.2 | 6.9 | 36 | 3.1 | 10 |
| 300 | 27 | 33.2 | 33.5 | 6.2 | 37 | 3.8 | 10 |

| | | | | | | | |
|---|---|---|---|---|---|---|---|
| 300 | 28 | 33.5 | 33.8 | 5.5 | 38 | 4.5 | 10 |
| 300 | 29 | 33.8 | 34.1 | 4.8 | 39 | 5.2 | 10 |
| 300 | 30 | 34.1 | 34.4 | 4.1 | 40 | 5.9 | 10 |
| 300 | 31 | 34.4 | 34.7 | 3.4 | 41 | 6.6 | 10 |
| 300 | 32 | 34.7 | 35 | 2.7 | 42 | 7.3 | 10 |
| 300 | 33 | 35 | 35.3 | 2 | 43 | 8 | 10 |
| 300 | 34 | 35.3 | 35.6 | 1.3 | 44 | 8.7 | 10 |
| 300 | 35 | 35.6 | 35.9 | 0.6 | 45 | 9.4 | 10 |
| 300 | 36 | 36 | 36.3 | 0 | 46 | 10 | 10 |
| 300 | 37 | 37 | 37.3 | 0 | 47 | 10 | 10 |
| 300 | 38 | 38 | 38.3 | 0 | 48 | 10 | 10 |
| 300 | 39 | 39 | 39.3 | 0 | 49 | 10 | 10 |
| 300 | 40 | 40 | 40.3 | 0 | 50 | 10 | 10 |
| 300 | 41 | 41 | 41.3 | 0 | 51 | 10 | 10 |
| 300 | 42 | 42 | 42.3 | 0 | 52 | 10 | 10 |
| 500 | 43 | 43 | 43.5 | 0 | 53 | 10 | 10 |
| 500 | 44 | 44 | 44.5 | 0 | 54 | 10 | 10 |
| 500 | 45 | 45 | 45.5 | 0 | 55 | 10 | 10 |
| 500 | 46 | 46 | 46.5 | 0 | 56 | 10 | 10 |
| 500 | 47 | 47 | 47.5 | 0 | 57 | 10 | 10 |
| 500 | 48 | 48 | 48.5 | 0 | 58 | 10 | 10 |
| 500 | 49 | 49 | 49.5 | 0 | 59 | 10 | 10 |
| 500 | 50 | 50 | 50.5 | 0 | 60 | 10 | 10 |
| 500 | 51 | 51 | 51.5 | 0 | 61 | 10 | 10 |
| 500 | 52 | 52 | 52.5 | 0 | 62 | 10 | 10 |

FIG. 5B (continued)

HYPOTHETICAL REFERENCE DECODER WITH LOW START-UP DELAYS FOR COMPRESSED IMAGE AND VIDEO

RELATED APPLICATIONS

The present application is a continuation of U.S. application Ser. No. 10/655,698, filed Sep. 5, 2003, now U.S. Pat. No. 7,532,670, issued May 12, 2009, which is a continuation-in-part of U.S. application Ser. No. 10/600,163, filed Jun. 19, 2003, now U.S. Pat. No. 7,257,162, issued Aug. 14, 2007, which claims the benefit of U.S. provisional application Ser. No. 60/393,665, filed Jul. 2, 2002, which are hereby fully incorporated by reference in the present application.

BACKGROUND OF THE INVENTION

1. Field of the Invention

The present invention relates generally to image and video signals. More particularly, the present invention relates to coding or compressing image and video signals.

2. Related Art

In video coding standards, such as MPEG-1, MPEG-2, MPEG-4, H.261, H.263 and the new H.264/MPEG-4 Part 10, a bitstream is determined to be conformant if the bitstream adheres to the syntactical and semantic rules embodied in the standard. One such set of rules takes the form of successful flow of the bitstream through a mathematical or hypothetical model of a decoder, which receives the bitstream from an encoder. Such a model decoder is referred to as the hypothetical reference decoder ("HRD") in some standards or the video buffer verifier ("VBV") in other standards. In other words, the HRD specifies rules that bitstreams generated by a video signal encoder must adhere to for such encoder to be considered conformant under a given standard. Stated differently, a HRD is a normative means according to which encoders must create bitstreams, which bitstreams adhere to certain rules and constraints, and real decoders can assume that such rules have been conformed with and such constraints are met.

The HRD serves to place constraints on the variations in bit rate over time in a compressed bitstream. HRD may also serve as a timing-and-buffering model for a real decoder implementation or for a multiplexor. Associated with the HRD are syntax elements defined in the standard, and algorithms embodied in software or hardware in various products such as encoders, multiplexors, conformance analyzers, and so on.

The HRD represents a means to communicate how the bit rate is controlled in the process of compression. The HRD may be designed for variable or constant bit rate operation, and for low-delay or delay-tolerant behavior. As shown in FIG. 1, HRD 100 includes pre-decoder buffer 110 (or VBV buffer) through which compressed bitstream 105 flows with a precisely specified arrival and removal timing. Compressed bitstream 105 contains a sequence of coded pictures 115 and associated ancillary messages, which flow into pre-decoder buffer 110 according to a specified arrival schedule. All compressed bits associated with a given coded picture 115 are removed from pre-decoder buffer 110 by instantaneous decoder 120 at the specified removal time of the picture. Pre-decoder buffer 110 overflows if the buffer becomes full and more bits are arriving. Pre-decoder buffer 110 underflows if the removal time for a picture occurs before all compressed bits representing the picture have arrived. Typically, HRDs differ in the means to specify the arrival schedule and removal times, and the rules regarding overflow and underflow of pre-decoder buffer 110.

HRDs in accordance with some existing standards such as H.263 and H.261 have been designed for low-delay operation. In short, such HRDs operate by removal of all bits associated with a picture the first time the buffer is examined, rather than at a time transmitted in the bitstream. Such HRDs do not specify when the bitstream arrives in the pre-decoder buffer. Therefore, such HRDs do not allow for precisely timed removal of bits from the pre-decoder buffer and create a difficulty for systems designed to display pictures with precise timing.

Other HRD standards, such as MPEG-2, can operate in variable bit rate or constant bit rate mode and also have a low-delay mode. The MPEG-2 HRD (known as the VBV) has two modes of operation based on whether a picture removal delay is transmitted in the bitstream or not. In the first mode of operation or mode A, when the removal delay is transmitted, the rate of arrival into the VBV buffer of each picture is computed based on picture sizes, the removal delay and additional removal time increments. Mode A can be used by the encoder to create both variable and constant bit rate streams. However, mode A suffers from a shortcoming that the entire bitstream must be scanned in order to make a determination as to whether a given bitstream has a constant bit rate. Mode A further suffers from an ambiguity at the beginning of the sequence that prevents the initial bit rate from being determined. Therefore, technically, mode A does not allow for a determination as to whether the bitstream is a constant bit rate ("CBR") bitstream.

In its second mode of operation or mode B (which is also referred to as a leaky bucket), unlike mode A, the encoder does not transmit the removal delays. In mode B, the arrival rate is constant unless the pre-decoder buffer is full, under which condition no bits arrive. Thus, mode B, having a constant arrival rate, does not introduce an ambiguity regarding the initial arrival rate. However, mode B has an arrival schedule, which may not be constrained to model the real production of bits. This unconstrained aspect of mode B can result in very large delays through a real decoder and limits its use as guidance for real-time multiplexors. In mode B, compressed data arrives in the VBV buffer at the peak rate of the buffer until the buffer is full, at which point the data stops. The initial removal time is the exact point in time when the buffer becomes full. Subsequent removal times are delayed by fixed frame or field periods with respect to the first.

As a hypothetical example of the long delays the Mode B may introduce, consider an encoder that produces a long sequence of very small pictures (i.e. few bits are used to compress each picture) at the start of the sequence. For the purpose providing an example, consider that 1,000 small pictures that can all fit in the VBV buffer are produced. All 1,000 pictures would enter the buffer in a time less than the time-equivalent of the buffer size, which is typically less than one second. The last of such pictures would then remain in the buffer for 999 picture periods longer than the first picture, or roughly 30 seconds. This requires that the encoder create a delay of that same amount of time before transmitting the first picture. However, in real-time broadcast applications, it is not generally possible to insert a thirty-second delay at the encoder. Rather, an encoder can only transmit the bits associated with the small pictures after they have been produced. In terms of a VBV model, this would introduce a series of time intervals during which the VBV buffer is not full, but no bits are entering. Therefore, a real-time encoder cannot imitate the buffer arrival timing of mode B of VBV.

In both modes A and B, the removal times are based on a fixed frame rate. Neither of these MPEG-2 VBV modes can handle variable frame rate, except for the one special case of film content captured as video. In this special case, the removal time of certain pictures is delayed by one field period, based on the value of a bit field in the picture header of that picture or a previous picture.

As opposed to mode A of VBV in which the encoder must prevent both buffer overflow and under flow, in mode B, it is impossible for the buffer to overflow, as data stops entering when the buffer becomes full. However, in mode B, the encoder must still prevent buffer underflow.

The MPEG-2 VBV also includes a separately specified low-delay mode. In the low-delay mode, the pre-decoder buffer may underflow occasionally and there are precise rules, involving skipping pictures, which define how the VBV is to recover. Because of the number of modes of operation, and the arcane method of handling the one special case of variable frame rate, the MPEG-2 VBV is overly complex. It also suffers from the initial rate ambiguity of Mode A and the non-causality of Mode B.

Further, while conventional HRDs allow for the use of the HRD compressed data buffer for purposes of rate and video quality control, as well as a low start-up delay at the beginning of the bitstream, the start-up delay at other random access points within the bitstream cannot be controlled without reducing the buffer size and/or modifying the rate control at the encoder and, thus, spending bits to achieve such modification.

A need exists for an improved hypothetical reference decoder that addresses the problems and deficiencies associated with the existing HRDs.

SUMMARY OF THE INVENTION

In accordance with the purpose of the present invention as broadly described herein, there is provided system and method for coding or compressing image and video signals. In one aspect of the present invention, a method is utilized for encoding each picture in a sequence of pictures, where the method comprises the steps of assigning a pre-decoder buffer removal time to the picture; selecting, for the picture, a number of bits, wherein the time-equivalent of the number of bits is no greater than a difference based on the pre-decoder buffer removal time of the picture and an initial arrival time of the picture into a pre-decoder buffer; and compressing the picture to generate the number of bits.

In a further aspect, the method also comprises the steps of allocating a first number of bits for compressing the picture and one or more number of bits for compressing one or more future pictures, wherein the future pictures are in the pre-decoder buffer at the pre-decoder buffer removal time of the current picture; determining, based on the numbers of bits in the allocating step, which of the future pictures will be in the pre-decoder buffer at the pre-decoder buffer removal time of the picture; changing the first number of bits for compressing the picture to allocate a final number of bits for compressing the picture if the changing is needed to prevent pre-decoder buffer overflow or underflow; and compressing the picture using the final number of bits. In one aspect, the method further comprises the step of determining an upper limit and a lower limit on the first number of bits for compressing the picture, wherein the first number of bits is not higher than the upper limit and the first number of bits is not lower than the lower limit.

In yet another aspect, the method also comprises the steps of determining a first limit on a number of bits for compressing the picture and one or more number of bits for compressing one or more future pictures, wherein the future pictures are in the pre-decoder buffer at the pre-decoder buffer removal time of the current picture; and compressing the picture using a first number of bits, wherein the first number of bits complies with the first limit. In one aspect, the first limit is an upper limit and the first number of bits is not higher than the upper limit or, alternatively, the first limit is lower limit and the first number of bits is not lower than the lower limit. Further, the method may comprise the step of: determining a second limit on a number of bits for compressing a current picture; wherein the first limit is an upper limit and the second limit is a lower limit, and wherein the first number of bits is not higher than the upper limit and the first number of bits is not lower than the lower limit.

In other aspects, computer software programs, systems and devices of the present invention can perform one or more steps of the aforementioned methods.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 illustrates an HRD conformance verifier;

FIG. 5A illustrates a set of parameters for a hypothetical reference decoder, according to one embodiment of the present invention; and FIG. 5B illustrates picture sizes for use by the hypothetical reference decoder of FIG. 5A for illustrating the plot of FIG. 4.

DETAILED DESCRIPTION OF THE INVENTION

The following description of the invention contains specific information pertaining to the implementation of the present invention. One skilled in the art will recognize that the present invention may be implemented in a manner different from that specifically discussed in the present application. Moreover, some of the specific details of the invention are not discussed in order to avoid obscuring the invention. The specific details not described in the present application are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings.

I. Overview of HRD and Buffering Verifiers

As discussed above, HRD 100 represents a set of requirements on bitstreams. These constraints must be enforced by an encoder, and can be assumed by a decoder or multiplexor to be true. According to one embodiment of the present invention shown in FIG. 3, HRD verifying system 300 can be constructed to verify conformance of a bitstream to the requirements set forth below by examining the bitstream.

Figure 1:
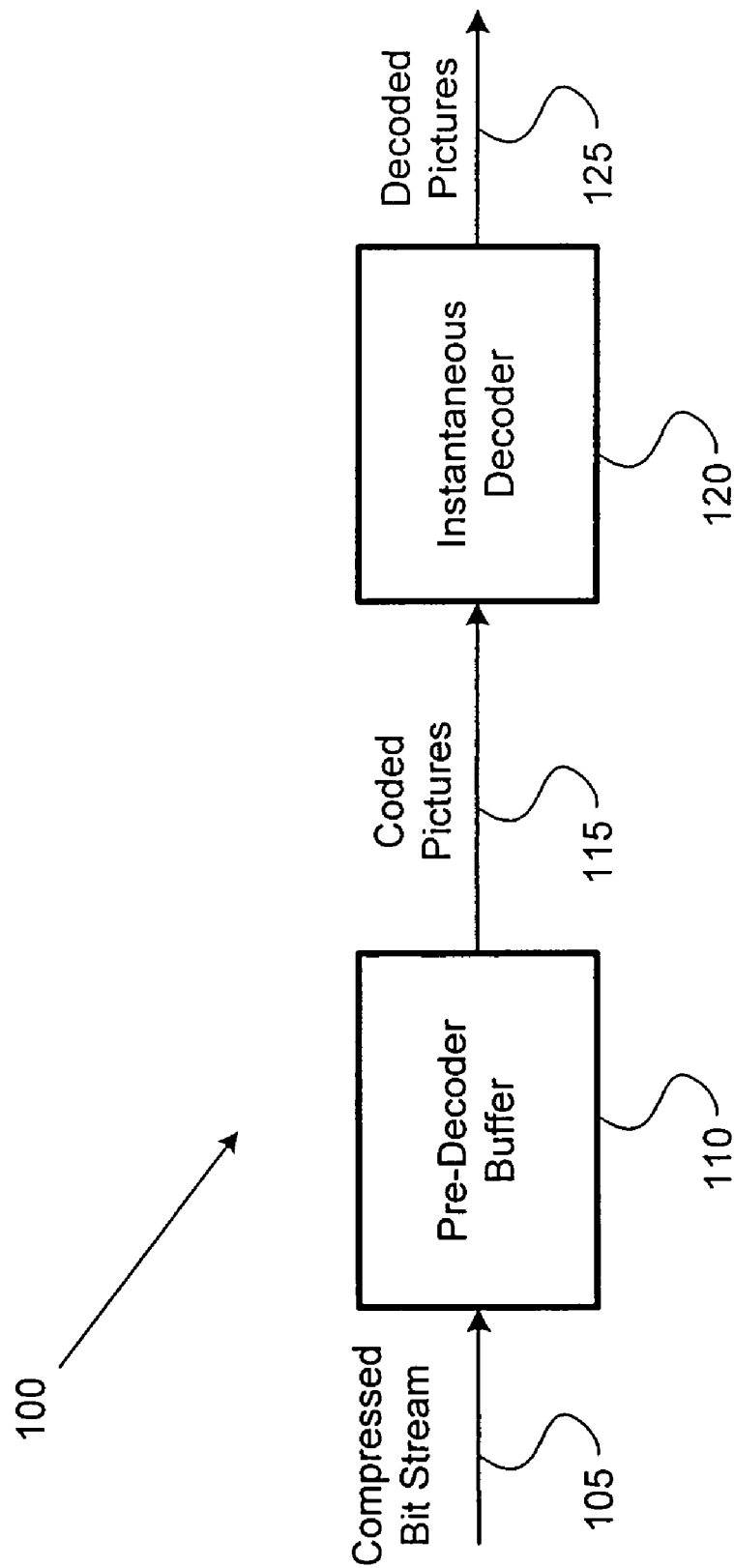
FIG. 1 illustrates a block diagram of a hypothetical reference decoder.
Figure 2A:
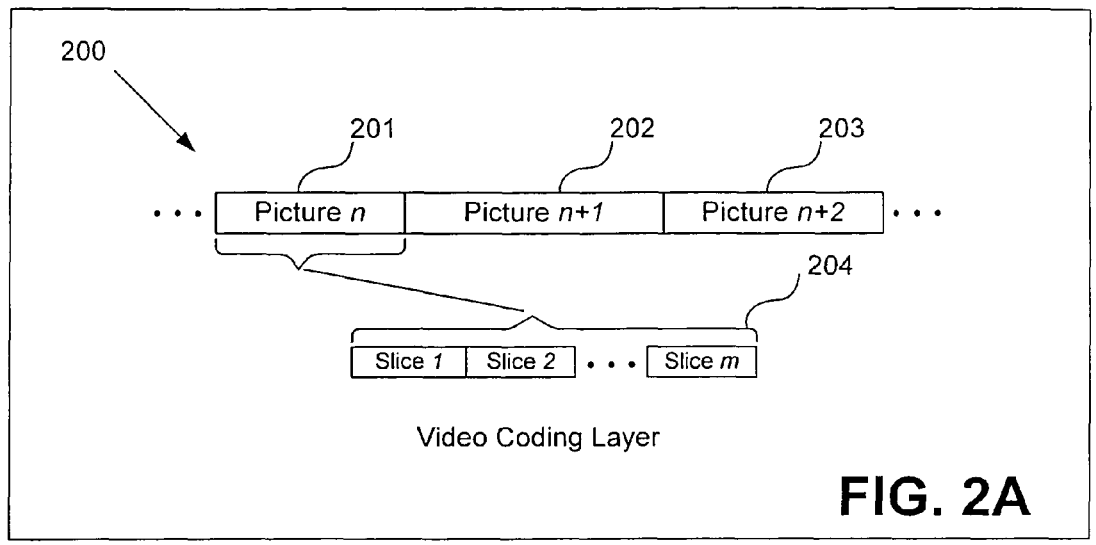
FIG. 2A illustrates the Video Coding Layer of the audio/video coding ("AVC") bitstream.
Figure 2B:
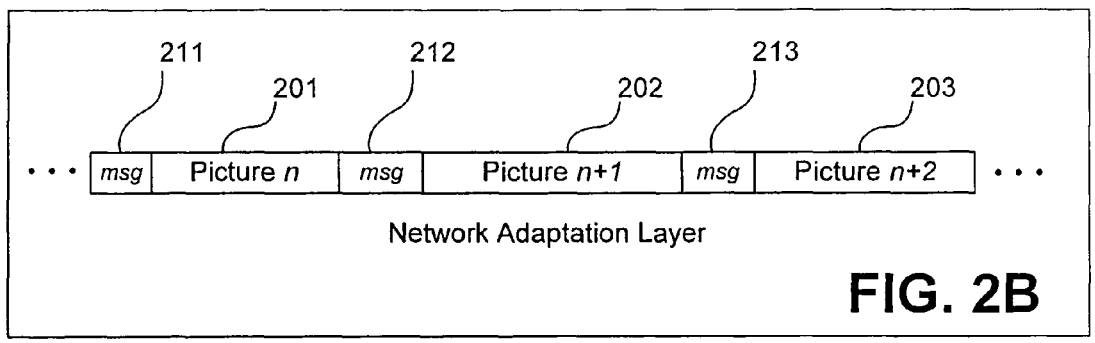
FIG. 2B illustrates the Network Adaptation Layer of the AVC bitstream.

In the following, the term bitstream shall be used to refer to all forms of AVC streams. As shown in FIG. 2, a bitstream conforming to the AVC HRD may include one or two layers. The first or lower layer, known as the Video Coding Layer (VCL) in the AVC standard, is composed of most of the information required to decode the pixel values which compose the decoded pictures. Each compressed picture comprises a set of one or more slices, and each slice further comprises the compressed data that represent a portion of the picture area. FIG. 2A shows a portion of a VCL including compressed picture n 200, compressed picture n+1 201, and compressed picture n+2 202. FIG. 2A further shows the slice partition 204 of compressed picture n. The second layer of the AVC standard is known as the Network Adaptation Layer (NAL). The NAL is composed of the compressed pictures from the VCL interleaved with additional messages such as: sequence level information which applies to the entire sequence of compressed pictures; picture attributes applying only to the next compressed picture in the bitstream; and other ancillary information. In AVC, both the VCL and NAL are partitioned into non-overlapping NAL units. FIG. 2B shows a portion of a NAL bitstream composed of the three compressed pictures 201-203 interleaved with additional messages in other NAL units 211-213. In short, the VCL is composed of a sequence of NAL units containing compressed pictures in the form of slices and the NAL is composed of a sequence of NAL units some of which are VCL NAL units and some of which contain other information. Both the VCL and the NAL forms are referred to as bitstreams in the following description.

An HRD may apply to the VCL or the NAL or both. Furthermore, multiple HRDs may apply to either form of the same bitstream. Each HRD may be a constant bit-rate or a variable bit-rate HRD. Such variations are signaled in the bitstream syntax given below.

In one embodiment, HRD 100 uses two time bases. One time base is a 90 kHz clock, which is in operation for a short time after the reception of a buffering period message, which is used for initializing HRD 100. The second time base uses the num_units_in_tick and time_scale syntax in the parameter set to derive the time interval between picture removals from the buffers, and in some cases between picture arrivals to pre-decoder buffer 110.

In the following description, $t_c$=num_units_in_tick/time_scale is the clock tick associated with the second clock, and be[t] and te[b] are the bit equivalent of a time t and the time equivalent of a number of bits b, with the conversion factor being the buffer arrival bit rate.

A. Operation of Pre-Decoder Buffer

1. Timing of Bitstream Arrival

Initially, when pre-decoder buffer 110 is empty, the first byte of the first transmitted picture begins to enter pre-decoder buffer 110 at initial arrival time $t_{ai}(0)=0$ at the bit-rate associated R with the particular VBV buffer (R=400*bit_rate_value_xxx). Further, the last bit of the first transmitted picture finishes arriving at final arrival time:

$$t_{af}(0)=b(0)/R, \quad (D-1)$$

where b(n) is the size in bits of the n-th transmitted picture, including either VCL bytes only or both VCL and NAL bytes, depending on the mode of operation of the HRD. The final arrival time for each picture is the sum of the initial arrival time and the time required for the bits associated with that picture to enter pre-decoder buffer 110:

$$t_{af}(n)=t_{ai}(n)+b(n)/R. \quad (D-2)$$

For each subsequent picture, the initial arrival time of picture n is the later of $t_{af}(n-1)$ and the sum of all preceding pre_dec_removal_delay times as indicated in equation D-3 below:

$$t_{ai}(n) = \max\left\{t_{af}(n-1), t_c \times \sum_{i=1}^{n} \text{pre\_dec\_removal\_delay}(n)\right\} \quad (D-3)$$

When an encoder is producing a bit rate lower than the bit rate associated with a VBV buffer, rule (D-3) may delay the entry of some pictures into pre-decoder buffer 110, producing periods during which no data enters.

2. Timing of Coded Picture Removal

In the event that HRD 100 pertains to VCL data only, the coded data associated with picture n includes all VCL data for that picture. If HRD 100 pertains to multiplexed VCL/NAL data, the coded data associated with picture n includes all VCL data for that picture plus all NAL data after the end of picture n−1 and before the end of picture n. For the first picture and all pictures that are the first complete picture after receiving a buffering period SEI message, the coded data associated with the picture is removed from the VBV buffer at a removal time equal to the following:

$$t_r(0)=pdrd\_xxx/90000 \quad (D-4)$$

where pdrd_xxx is the pre-decoder removal delay in the buffering period SEI message.

After the first picture is removed, pre-decoder buffer 110 is examined at subsequent points of time, each of which is delayed from the previous one by an integer multiple of the clock tick $t_c$, which is an integer multiple of the picture rate. The removal time $t_r(n)$ of coded data for picture n is delayed with respect to that of picture n−1; where the delay is equal to the number of picture periods indicated in the pre_dec_removal_delay syntax element present in the picture layer RBSP (Raw Byte Sequence Payload).

$$t_r(n)=t_r(n-1)+t_c \times \text{pre\_dec\_removal\_delay}(n) \quad (D-5)$$

Next, the coded data for the next transmitted picture is removed from pre-decoder buffer 100. In the event that the amount of coded data for picture n, b(n), is so large that removal cannot be accomplished at the computed removal time, the coded data is removed at the delayed removal time, $t_{r,ld}(n, m^*)$, given by:

$$t_{r,ld}(n,m^*)=t_r(0)+t_c \times m^*, \quad (D-6)$$

where m* is such that $t_{r,ld}(n, m^*-1) < t_{af}(n) \leq t_{r,ld}(n, m^*)$. This is an aspect of low-delay operation. This delayed removal time is the next time instant after the final arrival time $t_{af}(n)$ which is delayed with respect to $t_r(0)$ by an integer multiple of $t_c$.

3. Conformance Constraints on Coded Bitstreams

In one embodiment of the present invention, a transmitted or stored bitstream must fulfill some or all of the following four requirements to be considered conformant. First, for each picture, the removal times $t_r(n)$ computed using different buffering periods as starting points for decoding shall be consistent to within the accuracy of the two clocks used (90 kHz clock used for initial removal time and $t_c$ clock used for subsequent removal time calculations). In one embodiment, the consistency may be translated to mean equality. An encoder can comply with this requirement by computing the pre-decoder removal delay (pdrd_xxx) for a buffering period SEI message from the arrival and removal times computed using equations D-3 and D-5 above. In another embodiment, the removal delay computed using the Buffering period SEI message initial_pre_dec_removal_delay may be lower than that computed using the picture layer pre_dec_removal_delay.

Second, with the exception of isolated low-delay mode pictures that are described below, all bits from a picture must be in pre-decoder buffer 110 at the picture's computed removal time $t_r(n)$. In other words, a picture's final arrival time must precede the picture's removal time: $t_{af}(n) \leq t_r(n)$.

Third, if the final arrival time $t_{af}(n)$ of picture n exceeds its computed removal time $t_r(n)$, its size must be such that it can be removed from pre-decoder buffer 110 without overflow at $t_{r,d}(n,m^*)$ as defined above.

Fourth, if the bitstream conforms to CBR VBV buffer 260, data shall arrive continuously at the input to CBR VBV buffer 260. This is equivalent to ensuring that:

$$t_{af}(n-1) \geq t_c \times \sum_{i=1}^{n} \text{pre\_dec\_removal\_delay}(i).$$

Note that as a result of equation (D-3), the difference between the arrival times of the first picture $t_{ai}(0)$ and any other second picture $t_{ai}(n)$ can be no less than the sum of the removal delays of all the pictures after the first picture and before the second picture (including the second picture)

$$t_c \times \sum_{i=1}^{n} \text{pre\_dec\_removal\_delay}(n).$$

This sum of removal delays is exactly the difference in removal times between the two pictures $t_r(n)-t_r(0)$. However, other embodiments could use different measures of the difference, including the addition or subtraction of a fixed offset to the constraint.

B. Operation of Verifier

The conformance of a bitstream to the above described HRD constraints may be accomplished by means of a verifier as described below. FIG. 3 shows a verifier 300. Bitstream 310 is subjected to a sequence message filtering operation 301, which locates messages in the bitstream indicative of the bit rate and buffer size and extracts bit rate and buffer size information 311 and HRD configuration information 318 from the messages. Bitstream 310 is further subjected to a picture and buffering message filtering operation 302, which locates messages containing picture removal delay information 312 and extracts that information. Bitstream 310 is further subjected to a picture size computing operation 303, which produces the size of each compressed picture (in number of bits) 313. Information 311, 312 and 313 are used within arrival and removal time computing element 304 to determine the initial and final arrival times and removal time for each compressed picture according to sections I.A.1 and I.A.2 described above. For each compressed picture, times 314, 315 and 316 are used within constraint checker 305 to indicate conformance according to the constraints described in section I.A.3, which constraints are implemented in constraint checker 305 depends on HRD configuration information 318.

II. HRD Description

The following section of the present application complements the normative description of the previous section by providing an informative description of the present invention, which includes the explanatory text describing the operation and capabilities of HRD 100.

A. Constrained Arrival Time Leaky Bucket (CAT-LB) Model

HRD 100 of the present application is a mathematical model for a decoder, a decoder input buffer, and the channel. HRD 100 is characterized by the channel's peak rate R (in bits per second), the buffer size B (in bits), the initial decoder removal delay T (in seconds), and picture removal delays for each picture. The first three parameters $\{R, B, T\}$ represent levels of resources (transmission capacity, buffer capacity, and delay) used to decode a bitstream.

The above-referenced term "leaky bucket" arises from analogizing the encoder to a system that dumps water in discrete chunks into a bucket with a hole. The departure of bits from the encoder buffer corresponds to water leaking out of the bucket. Typically, the decoder buffer has an inverse behavior, where bits flow in at a constant rate, and are removed in chunks. The leaky bucket described in the present application can be termed a constrained arrival time leaky bucket (CAT-LB), because the arrival times of all pictures after the first are constrained to arrive at the buffer input no earlier than the difference in hypothetical encoder processing times between that picture and the first picture. For example, if a second picture is encoded exactly seven (7) seconds after the first picture was encoded, then the second picture's bits are guaranteed not to start arriving in the buffer prior to seven (7) seconds after the bits of the first picture started arriving. It should be noted that this encoding time difference is sent in the bitstream as the picture removal delay.

1. Operation of the CAT-LB HRD

Pre-decoder buffer 110 has a capacity of B bits. Initially, pre-decoder buffer 110 begins empty. The lifetime of the coded bits, in pre-decoder buffer 110, associated with picture n is characterized by the arrival interval $\{t_{ai}(n), t_{af}(n)\}$ and the removal time $t_r(n)$. The end-points of the arrival interval are known as the initial arrival time and the final arrival time. At time $t_{ai}(0)=0$, pre-decoder buffer 110 begins to receive bits at the rate R. The removal time $t_r(0)$ for the first picture is computed from the pre-decoder removal delay pdrd_xxx of buffering period SEI message associated with pre-decoder buffer 110 by the following:

$$t_r(0)=90,000 \times pdrd\_xxx. \tag{D-7}$$

Removal times $t_r(1), t_r(2), t_r(3), \ldots$, for subsequent pictures (in transmitted order) are computed with respect to $t_r(0)$, as follows, where the picture period $t_c$ is defined by:

$$t_c = \text{num\_units\_in\_tick/time\_scale} \tag{D-8}$$

It should be noted that the picture period is the shortest possible inter-picture capture interval in seconds for the sequence. For instance, if time_scale=60,000 and num_units_in_tick=1,001, then:

$$t_c=1,001/60,000 =16.68333\ldots\text{milliseconds.} \tag{D-9}$$

In the picture layer RBSP for each picture, there is a pre_dec_removal_delay syntax element. This element indicates the number of picture periods to delay the removal of picture n after removing picture n−1. Thus, the removal time is simply:

$$t_r(n)=t_r(n-1)+t_c \times \text{pre\_dec\_removal\_delay}(n) \tag{D-10}$$

Yet, this recursion can be used to show that:

$$t_r(n) = t_r(0) + t_c \times \sum_{l=1}^{n} [\text{pre\_dec\_removal\_delay}(m)] \quad \text{(D-11)}$$

The calculation of arrival times is more complex, because of the causality constraint. The initial arrival time of picture n is equal to the final arrival time of picture n−1, unless that time precedes the earliest arrival time, computed by $$t_{ai,earliest}(n) = t_c \times \sum_{l=1}^{n} [\text{pre\_dec\_removal\_delay}(m)] \quad \text{(D-12)}$$

Where b(n) is the number of bits associated with picture n, the duration of the picture arrival interval is always the time-equivalent of the picture size in bits, at the rate R:

$$t_{af}(n) - t_{ai}(n) \equiv te[b(n)] = b(n)/R \quad \text{(D-13)}$$

Figure 4:
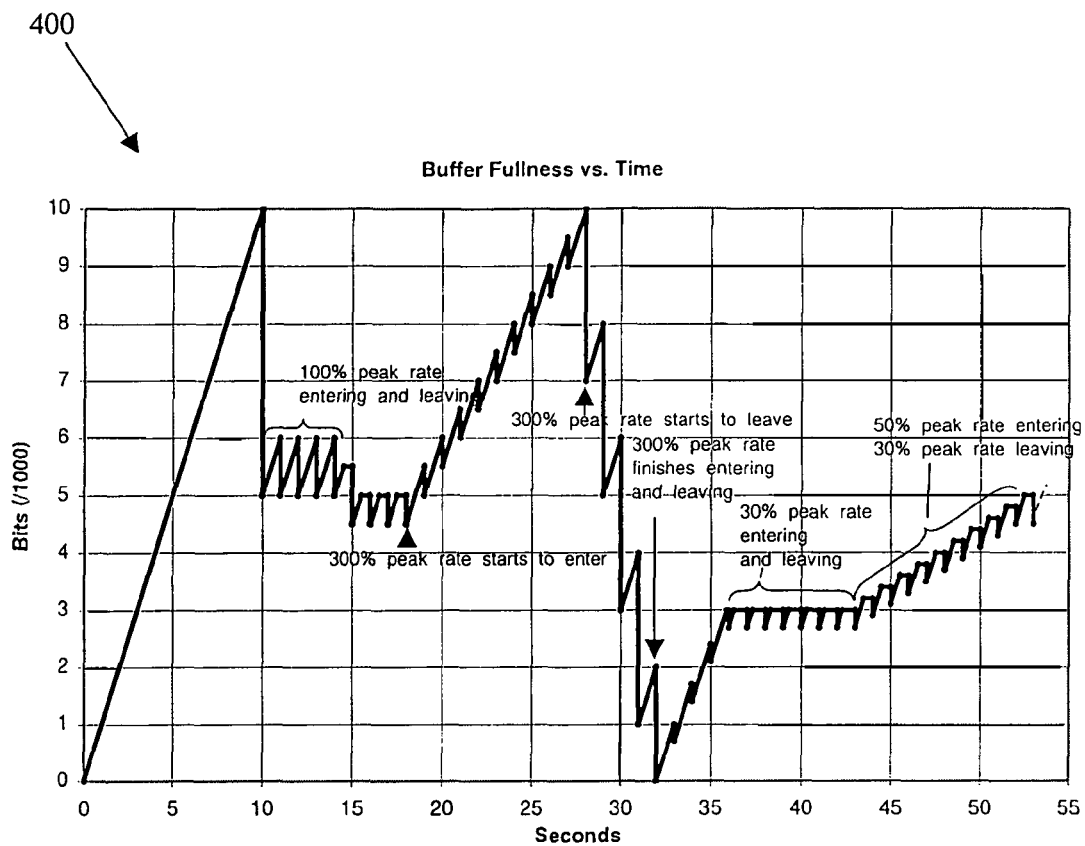
FIG. 4 illustrates a buffer fullness plot for hypothetical reference decoder of FIG. 5A with picture sizes given in FIG. 5B, according to one embodiment of the present invention.

FIG. 4 illustrates a segment of buffer fullness plot 400 for a CAT-LB with the parameters given in table 500 of FIG. 5A and picture sizes given by column 551 of table 550 in FIG. 5B. Note that table 550 lists values for many times of interest in the buffering process. In table 550, $t_e$ is encoding time column 552, which represents a hypothetical encoding time equal to the earliest possible initial arrival time of the picture, $t_{ai}-t_e$ is initial arrival time column 553, $t_{af}$ is final arrival time column 554, $t_{ai}-t_e$ is initial arrival time less encoding time column 555, $t_r$ is removal time column 556, $t_r-t_{ai}$ is removal time less initial arrival time column 557 and $t_r-t_e$ is removal time less encoding time column 558.

Referring to FIG. 4, it can be seen that the first picture is large, and is then followed by five (5) pictures at exactly the buffer arrival rate R, which is followed by twelve (12) pictures at half the rate, four (4) pictures at three times the rate and one (1) picture at twice the rate. Following the above pictures, FIG. 4 illustrates two segments with pictures at 30% and 50% of the rate, respectively. Further, the time interval of buffer fullness plot 400 from ten (10) seconds to eighteen (18) seconds illustrates HRD 100 behavior when the bit rate is constant and at or below the rate R. As shown, when the arrival bit rate remains less than R for a time, the lower points of the fullness curve will not change. Further, the fullness at the peak in such a segment will be proportional to the fraction of the peak rate being consumed by the pictures.

The time interval of buffer fullness plot 300 from eighteen (18) seconds to twenty-eight (28) seconds, shows a temporary effect of an increase in arrival rate to above R. Once the large pictures start exiting pre-decoder buffer 110, the bit rate of pictures leaving pre-decoder buffer 110 exceeds R, and the fullness decreases. This process terminates at the thirty-two (32) second point, when the large pictures have exited pre-decoder buffer 110 and the series of smaller pictures starts entering pre-decoder buffer 110. During the time interval of buffer fullness plot 300 from thirty-six (36) seconds to forty-three (43) seconds, the 30% peak rate pictures are entering and leaving pre-decoder buffer 110. Further, and during the time interval of buffer fullness plot 300 from forty-three (43) seconds to fifty-two (52) seconds, 30% peak rate pictures are shown to be leaving while 50% peal rate pictures are entering pre-decoder buffer 110. As a result, the buffer fullness rises. Once 50% peak rate pictures begin to leave pre-decoder buffer 110, the fullness stabilizes at 50% full. It should be noted that VBV Buffer stabilizes at a fullness that is proportional to the ratio of the short-term average bit rate to the arrival bit rate.

In general, the curve of buffer fullness plot 300 is given by the following expression:

$$BF(t) = \sum_{n} [I(t_{af}(n) \leq t < t_r(n)) \times b(n) + \quad \text{(D-14)}$$
$$I(t_{ai}(n) < t < t_{af}(n)) \times be(t - t_{ai}(n))]$$

The above expression uses indicator functions I(·) with time-related logical assertions as arguments to sum those pictures that are completely in pre-decoder buffer 110 at time t, plus the appropriate portion of the picture currently entering pre-decoder buffer 110, if any. The indicator function I(x) is "1" if x is true and "0" otherwise.

2. Low-Delay Operation

Low-delay behavior is obtained by selecting a low value for the initial pre-decoder removal delay. This results in true low delay through the buffer, because under normal operation, no removal delay ($t_r(n)-t_{ai}(n)$) can exceed the initial removal delay $t_r(0)$. For example, if the maximum removal delay for picture n occurs when the initial arrival time is equal to the earliest arrival time, then the maximum removal delay is given by $t_r(n)-t_{ai.earliest}(n)$. But, $$t_r(n) = t_r(0) + t_c \times \sum_{l=1}^{n} [\text{pre\_dec\_removal\_delay}(m)] \quad \text{(see D-11)}$$

and $$t_{ai,earliest}(n) = t_c \times \sum_{l=1}^{n} [\text{pre\_dec\_removal\_delay}(m)] \quad \text{(see D-12)}$$

therefore $$t_r(n) - t_{ai,earliest}(n) = t_r(0). \quad \text{(D-15)}$$

In other words, setting an initial low delay creates a steady-state low-delay condition. However, in low-delay operation, it is useful to be able to process the occasional large picture whose size is so large that it cannot be removed by its indicated removal time. Such a large picture can arise at a scene change, for example. This would ordinarily lead to an "underflow" condition. When a large picture is encountered, the rules for removal are relaxed to prevent an underflow. The picture is removed at the delayed removal time, $t_{r,ld}(n, m^*)$, given by $$t_{r,ld}(n,m^*) = t_r(0) + t_c \times m^*, \quad \text{(D-16)}$$

where m* is such that $t_{r,ld}(n, m^*-1) < t_{ai}(n) + te[B(n)] \leq t_{r,ld}(n, m^*)$. Note that pre-decoder buffer 110 must be large enough that such large picture can be accommodated without overflow. Immediately after such large picture is received the removal time of the next picture should be such that low-delay operation is resumed, which an encoder can facilitate by skipping a number of pictures immediately after the large picture, if necessary. Such low-delay operation may be achieved without explicit signaling in the bitstream.

3. Bitstream Constraints

Pre-decoder buffer 110 should not be allowed to underflow or overflow. Furthermore, all pictures except the isolated big pictures should be completely in pre-decoder buffer 110 before their computed removal times. Isolated big pictures are allowed to arrive later than their computed removal times, but should still obey the overflow constraint. In CBR mode, there must be no gaps in bit arrival.

a. Underflow

The underflow constraint, BF(t)≧0 for all t, is satisfied if the final arrival time of each picture precedes its removal time.

$$t_{af}(n) \leq t_r(n) \quad \text{(D-17)}$$

The underflow constraint creates an upper bound on the size of picture n. The picture size may not be larger than the bit-equivalent of the time interval from the start of arrival to the removal time.

$$b(n) \leq be[t_r(n) - t_{ai}(n)] \quad \text{(D-18)}$$

Since the initial arrival time $t_{ai}(n)$ is in general a function of the sizes and removal delays of previous pictures, the constraint on b(n) will vary over time as well.

b. Overflow

Overflow can be avoided provided that the buffer fullness curve BF(t) never exceeds the buffer size B. The overflow constraints are that the initial pre-decoder removal delay must not be larger than the time-equivalent of the buffer size, $t_r(0) \leq te(B)$, and, under normal operation, removal delay must not exceed the initial removal delay. To avoid overflow of an isolated big picture, the picture size is constrained by the following:

$$b(n) \leq be[B - t_{ai}(n)] \quad \text{(D-19)}$$

c. Constant Bit Rate (CBR) Operation

The CAT-LB model operates in constant bit rate mode if an additional constraint is applied to ensure that data constantly arrive at the input of pre-decoder buffer 110. As a result, the average rate is equal to the buffer rate R. Such additional constraint can be conformed with if the final arrival time of picture n is no earlier than the earliest initial arrival time of picture n+1. This time constraint places a lower bound on b(n).

$$t_{af}(n) \geq t_{ai,earliest}(n+1) = t_c \times \sum_{l=1}^{n} [\text{pre\_dec\_removal\_delay}(m)] \quad \text{(D-20)}$$

4. Rate Control Considerations

An encoder may employ rate control as a means to constrain the varying bit rate characteristics of the bitstream in order to produce high quality coded pictures at the target bit rate(s). A rate control algorithm may target a VBR or CBR, or alternatively, a rate control algorithm may even target both a high peak rate using a VBR scheme and an average rate using a CBR scheme. Yet, multiple VBR rates may also be targeted.

This section discusses the VBV influence on rate control. In a VBR VBV, the buffer must not overflow or underflow, but gaps may appear in the arrival rate. In order to meet these constraints, the encoder must ensure that for all t, the following inequalities remain true:

$$0 \leq BF(t) \leq B, \text{ for all } t. \quad \text{(D-21)}$$

Using Equation D-14, D-21 becomes:

$$0 \leq \sum_{n} [I(t_{af}(n) \leq t < t_r(n)) \times b(n) + \quad \text{(D-22)}$$

$$I(t_{ai}(n) < t < t_{af}(n)) \times be(t - t_{ai}(n))] \leq B,$$

for all t.

The buffer fullness B(t) is a piecewise non-decreasing function of time, with each non-decreasing interval bounded by two consecutive removal times. Therefore, it is sufficient to guarantee the conformance at the interval endpoints; i.e. at the removal times. In particular, if an underflow is prevented at the start of an interval (just after removal of a picture), it is completely prevented. The same holds for overflow at the end of the interval, just prior to picture removal. Therefore, the points of interest are the removal times. At $t_r^-(n)$, picture n and possibly some additional pictures up to picture m>n (with the last picture possibly only partially in the buffer), are in the buffer and contribute to Equation D-22. All pictures earlier than picture n have been removed. At $t_r^+(n)$, picture n has been removed.

Accordingly, when encoding picture n, the rate control goal is to allocate bits to picture n and the others in the immediate future in such a way that overflow is prevented at $t_r^-(n)$, and underflow is prevented at $t_r^+(n)$. Further, as long as b(n) is small enough so that $te[b(n)] \leq t_r(n) - t_{ai}(n)$, both overflow at $t_r^-(n)$ and underflow at $t_r^+(n)$ are prevented. This is usually a very high limit, and a rate control method can further limit b(n) through its allocation process.

Furthermore, a bitstream conformant to the above-described HRD constraints may be created by means of a video compression encoder as described below. For brevity, the aspects of a video compression encoder not directly relevant to the HRD process are not described in detail. As a first step, in one embodiment, a pre-decoder buffer removal time for picture n is determined. It should be noted that the difference between consecutive pre-decoder buffer removal times is usually a function of the difference between the capture times of the respective pictures, possibly with some modifications to account for differences between capture order and encoding order. These variations are well known to those of ordinary skill in the art. Now, once the pre-decoder buffer removal time for picture n is determined, and all compressed picture sizes are known for pictures encoded before picture n, an upper bound can be determined on b(n), i.e. $te[b(n)] \leq t_r(n) - t_{ai}(n)$. In one embodiment, a conformant encoder simply ensures that this bound is not exceeded, generally, by using feedback and/or feed-forward control of the quantization parameters.

However, ensuring that the above-referenced bound is not exceeded may not be a complete rate control solution for certain applications, which produce high quality video. For instance, a greedy algorithm that uses all the bits available according to the above inequality for the current picture would cause some pictures captured immediately after picture n to be skipped (compressed with zero bits). This would be unacceptable in certain applications, for instance in broadcast television or DVD authoring.

In order to provide further improvement, an encoder may estimate or allocate the number of bits required for future pictures in some manner. In this context, future pictures with respect to picture n are pictures that will be compressed after picture n. Future pictures may in some instances have been captured earlier than the capture time for picture n, as is the case with B-pictures in MPEG-1, MPEG-2, and MPEG-4. The estimated or allocated number of bits can be used in place of the actual number of bits in Equation D-22. From this a target value or upper and lower limits on b(n) can be determined. This can result in an improved target value for b(n) or upper and lower limits on b(n) and leave bits for pictures in the immediate future. The estimation or allocation process should include all future pictures that will reside in the pre-decoder buffer at removal time $t_r(n)$. As equation (D-22) shows, this depends on the number of bits estimated or allocated to the pictures.

If the estimation or allocation process indicates that buffer overflow or underflow will occur at or near $t_r(n)$, action can be taken to reduce the number of bits for some or all the pictures involved in the estimate, in order to bring the resulting value or limits within conformance. Generally, this involves changing the quantization parameters used in the encoding process and re-estimating the bits produced. Once a target value for or limits on b(n) are determined, the encoder then must produce a number of bits either meeting the value or within the limits (rate-controlled encoding). There are many approaches known to practitioners to perform this estimation or allocation process and subsequent rate-controlled encoding process, and any of such approaches may be used advantageously in combination with the present invention. For example, the estimation may be based upon actual bits used to code pictures in the past. As another example, the rate-controlled encoding may use a combination of a target and limits, and it may further allocate the picture bit target among regions of the current picture for the purpose of better rate- and quality-control.

III. Exemplary Syntax for the HRD

The following syntax shown in Table 1 is example syntax representing some of sequence level information 318. In one embodiment, it is contained within AVC syntax known as parameter set RBSP, between time_scale and num_slice_groups.

TABLE 1

| | | |
|---|---|---|
| time_scale | 0 | u(32) |
| /* HRD Syntax in Parameter Set */ | | |
| nal_hrd_indicator | 0 | u(1) |
| if ( nal_hrd_indicator = = 1 ) | | |
|    hrd_parameters( ) | | |
| vcl_hrd_indicator | 0 | u(1) |
| if ( vcl_hrd_indicator = = 1 ) | | |
|    hrd_parameters( ) | | |
| num_slice_groups | 0 | u(3) |

Table 2 below shows example syntax for the remaining sequence level information 318 and for sequence level information 311.

TABLE 2

| | |
|---|---|
| Hrd_parameters( ) { | |
|   /* CBR-VBV Parameters */ | |
|   vbvi_cbr | u(1) |
|   if (vbvi_cbr) { | |
|     bit_rate_value_cbr | u(18) |
|     pre_dec_buffer_size_value_cbr | u(12) |
|   } | |
|   /* VBR-VBV Parameters */ | |

TABLE 2-continued

| | |
|---|---|
|   vbvi_vbr | u(4) |
|   for (k = 0; k<= vbvi_vbr; k++) { | |
|     bit_rate_value_vbr[k] | u(18) |
|     pre_dec_buffer_size_value_vbr[k] | u(12) |
|   } | |
| } | |

The following Table 3 shows example syntax for picture removal delay information 312 for use in conjunction with HRD 100, where the HRD syntax is inserted before the rbsp_trailing_bits( ) syntax element.

TABLE 3

| picture_layer_rbsp( ) { | Category | Descriptor |
|---|---|---|
|   ... | | |
|   pre_dec_removal_delay | 3 | e(v) |
|   rbsp_trailing_bits( ) | | |
| } | | |

Further, the following illustrates example semantics for the above syntactical elements for HRD 100. If nal_hrd_indicator="1", the multiplexed NAL and VCL bitstream conforms with the HRD, as specified above. In such event, the HRD parameters follow the nal_hrd_indicator in the parameter set syntax. If nal_hrd_indicator="0", the multiplexed NAL and VCL bitstream is not guaranteed to comply with the HRD. If vcl_hrd_indicator="1", the VCL bitstream conforms with the HRD, as specified above. In such event, the HRD parameters follow the vcl_hrd_indicator in the parameter set syntax. If vcl_hrd_indicator="0", the VCL bitstream is not guaranteed to comply with the HRD.

If VBV indicator for Constant Bit Rate vbvi_cbr="0", the bitstream does not comply with a CBR-VBV Buffer, and vbvi_cbr="1" means that the bitstream conforms with a CBR-VBV Buffer, and that CBR-VBV buffering parameters follow in the syntax. VBV indicator for Variable Bit Rate or vbvi_vbr indicates the number of VBR VBV Buffers that the bitstream conforms with, and vbvi_vbr="0" is allowed. In one embodiment, when HRD configuration information indicates a low-delay operation, the sum of vbvi_cbr and vbvi_vbr must be no more than one, i.e. only one VBV buffer is supported.

A positive integer coded using the universal VLC, pre_dec_removal_delay indicates how many clock ticks to wait after removal from the HRD pre-decoder buffer 110 of the coded data associated with the previous picture before removing the coded data associated with this picture from the buffer. This value is also used to calculate an earliest possible time of arrival of bits into the pre-decoder buffer, as defined above.

Table 4 below shows example buffering period message syntax for picture removal delay information 312 for use in conjunction with HRD 100.

TABLE 4

| Buffering_period_message ( ) { | Category | Mnemonic |
|---|---|---|
|   parameter_set_id(independent_GOP_parameter_set) | | e(v) |
|   if (nal_hrd_indicator = = 1 ) { | | |
|     if ( vbvi_cbr = = 1 ) | | |
|       pdrd_cbr | | u(16) |
|     for ( k = 0; k <= vbvi_vbr; k++ ) | | |
|       pdrd_vbr[k] | | u(16) |
|   } | | |
|   if ( vcl_hrd_indicator = = 1 ) { | | |
|     if ( vbvi_cbr = = 1 ) | | |

TABLE 4-continued

| Buffering_period_message ( ) { | Category | Mnemonic |
|---|---|---|
|     pdrd_cbr | | u(16) |
|     for (k = 0; k <= vbvi_vbr; k++) | | |
|         pdrd_vbr[k] | | u(16) |
|   } | | |
| } | | |

The following illustrates example buffering period message semantics for picture removal delay information 312 for HRD 100. The parameter set ID indicates the parameter set that contains the sequence level HRD attributes. The fields pdrd_cbr and pdrd_vbr[k] represent the pre-decoder removal delay of a pre-decoder buffer in units of a 90 kHz clock. Each pdrd_xxx value represents the delay between the time of arrival in the pre-decoder buffer of the first byte of the coded data associated with the picture (including all NAL data) and the time of removal of the coded data associated with the picture. The pdrd_xxx fields are used in conjunction with the VBV buffers as specified above. A value of zero is forbidden for pdrd_xxx.

IV. Summary of Exemplary Embodiments and Advantages of the HRD

As discussed above, in one aspect of the present invention, a pre-decoder buffer removal time delay is transmitted for each picture, which is represented by the syntax elements pdrd_xxx in the buffering period SEI message and pre_dec_removal_delay[n] in the picture layer. In conventional hypothetical reference decoders, the removal time for removing a picture from the pre-decoder buffer is either the earliest possible time that the picture can be removed or is calculated based on a fixed frame rate—with a rule to handle one specific exception from fixed frame rate in the case of the MPEG-2 standard. However, according to one embodiment of the present invention, each picture is removed from the pre-decoder buffer at a time calculated by adding the pre-decoder buffer delay (which is transmitted for each picture) to the removal time of the previous picture.

Accordingly, HRD of the present invention can handle variable frame rate video arising from any source. For example, in the case of handling the carriage of film over video in MPEG-2, the HRD of MPEG-2 has special removal time rules based on the repeat_first_field_flag in the picture header, which causes the removal delays to alternate between two field times and three field times. In the case of video conferencing, on the other hand, the frame rate may change as the coding difficulty of the scene changes. Both the above cases and others can be handled by transmission of the explicit removal delay in the above-mentioned HRD embodiment of the present invention. In short, this embodiment of the present invention unifies multiple variable frame rate applications that conventional HRDs have handled in non-unified ways.

Another aspect of the present invention is the delayed timing of the arrival of bits into the pre-decoder buffer based on the same removal time delays, which results in a constrained leaky-buffer model. As a further advantage of this aspect of the present invention the same HRD model can handle both low-delay and delay-tolerant scenarios. An HRD, in accordance with this aspect of the present invention, can operate in either low-delay or delay-tolerant modes without explicitly signaling its mode of operation, since a decoder can determine the real maximum delay in seconds induced by the bitstream rate variations. Low-delay applications can set a low initial removal delay by setting pdrd_xxx to an appropriate low value. Delay-tolerant applications may set the initial delay to any value small enough that the buffer would not overflow if it is receiving data at peak rate for that period of time.

Yet another aspect of the present invention includes two layers of conformance. Unlike conventional HRDs, in one embodiment, HRD of the present invention can be signaled in the bitstream that the VCL conforms to an HRD, or that the NAL+VCL conforms to an HRD, or that both conform to an HRD. This aspect of the present invention is significant when a bitstream may be repurposed or transcoded from one network environment to another.

In a further embodiment, HRD of the present application applies HRD-related constraints to a rate control algorithms as time-related inequalities, rather than picture-size related inequalities.

The following are a number of advantages that may be achieved using one or more aspects of the present invention: enabling flexible variable frame-rate operation; more closely matching HRD pre-decoder buffer arrival times with those produced by real-time encoders, which simplifies the real-time multiplexing problem; bitstreams are independently verifiable and the HRD accommodates a leaky bucket approach and is consistent with the multiple-leaky-bucket approach; arrival time delays described in the HRD do not have to be actualized in a streaming environment; provides for HRD parameters for VCL, NAL+VCL or both; NAL+VCL HRD parameters can be added to an existing bitstream with VCL HRD; and the amount of delay in time through a low-delay HRD is explicitly controlled.

Various embodiments of the invention are not discussed here but are apparent to a person of ordinary skill in the art. For example, there are numerous ways to represent the pre-decoder removal delay both in the buffering period message and in the picture message. It is also anticipated that the exact number of bits used to represent the syntax elements or the formulas for converting the syntax elements to physical quantities, such as bit rates and buffer sizes, could change without departing from the scope of the present invention. Moreover, the exact rule for computing the earliest possible arrival times could be modified to allow for a one-time shift in time. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A system for processing compressed data, said compressed data including a first picture (n−1) and a subsequent second picture (n), each of said pictures including a plurality of bits starting with a first bit, said system comprising:

a decoder configured to receive said compressed data and decompress said compressed data, said decoder having a pre-decoder buffer configured to buffer said compressed data;

wherein said first bit of said first picture (n−1) enters said pre-decoder buffer at a first time and said first bit of said second picture (n) enters said pre-decoder buffer at a second time, and wherein said first bit of said first picture (n−1) leaves said pre-decoder buffer at a third time and said first bit of said second picture (n) leaves said pre-decoder buffer at a fourth time; and wherein said fourth time is delayed after said third time, and wherein said second picture (n) is removed from the pre-decoder buffer at a removal time $t_r(n)$, where $t_r(n)=t_r(n-1)+t_c \times pre\_dec\_removal\_delay(n)$, where $t_r(n-1)$ is a removal time of said first picture (n−1) from the pre-decoder buffer, $t_c$ is a clock tick, and pre_dec_removal_delay(n) is a number of picture periods indicated in a syntax element present in a picture layer RBSP (Raw Byte Sequence Payload).

2. The system of claim 1, wherein said first picture (n) is removed from the pre-decoder buffer at a removal time equal to pdrd_xxx/90000, where pdrd_xxx is a pre-decoder removal delay in a buffering period SEI message.

3. The system of claim 1, wherein a third picture (n+1) enters said pre-decoder buffer after said second picture (n), and wherein said third picture (n+1) is removed from the pre-decoder buffer at a removal time $t_{r,d}(n+1)$, where $t_{r,d}(n+1,m)=t_r(0)+t_c \times m$, where m is such that $t_{a,f}(n+1, m-1)<t_{a,f}(n+1) \leq t_{r,ld}(n+1, m)$, where $t_{a,f}(n+1)$ is a final arrival time of said third picture (n+1) in said pre-decoder buffer, wherein $t_r(0)$ is the removal time for the first picture, m is an integer, and $t_{r,ld}(n+1, m)$ defines a delayed removal time for preventing an underflow.

4. The system of claim 1, wherein a difference based on said second time and said first time is not less than a difference based on said fourth time and said third time.

5. The system of claim 1, wherein said second time less said first time is greater than or equal to said fourth time less said third time.

6. The system of claim 1, wherein said second time less said first time is greater than or equal to said fourth time less said third time less a fixed time.

7. The system of claim 1 further comprising an encoder, wherein said encoder generates said compressed data and transmits said compressed data to said decoder so as to ensure that said difference based on said second time and said first time will not be less than said difference based on said fourth time and said third time.

8. A method for processing compressed data through a pre-decoder buffer, said compressed data including a first picture (n−1) and a subsequent second picture (n), each of said pictures including a plurality of bits starting with a first bit, said method comprising:

storing said first bit of said first picture (n−1) in said pre-decoder buffer at a first time;

storing said first bit of said second picture (n) in said pre-decoder buffer at a second time;

removing said first bit of said first picture (n−1) from said pre-decoder buffer at a third time; and removing said first bit of said second picture (n) from said pre-decoder buffer at a fourth time;

wherein said fourth time is delayed after said third time, and wherein said second picture (n) is removed from the pre-decoder buffer at a removal time $t_r(n)$, where $t_r(n)=t_r(n-1)+t_c \times pre\_dec\_removal\_delay(n)$, where $t_r(n-1)$ is a removal time of said first picture (n−1) from the pre-decoder buffer, $t_c$ is a clock tick, and pre_dec_removal_delay(n) is a number of picture periods indicated in a syntax element present in a picture layer RBSP (Raw Byte Sequence Payload).

9. The method of claim 8 further comprising: removing said first picture (n) from the pre-decoder buffer at a removal time equal to pdrd_xxx/90000, where pdrd_xxx is a pre-decoder removal delay in a buffering period SEI message.

10. The method of claim 8, wherein a third picture (n+1) enters said pre-decoder buffer after said second picture (n), and the method further comprising: removing said third picture (n+1) from the pre-decoder buffer at a removal time $t_{r,d}(n+1)$, where $t_{r,d}(n+1,m)=t_r(0)+t_c \times m$, where m is such that $t_{a,f}(n+1, m-1)<t_{a,f}(n+1) \leq t_{r,ld}(n+1, m)$, where $t_{a,f}(n+1)$ is a final arrival time of said third picture (n+1) in said pre-decoder buffer, wherein $t_r(0)$ is the removal time for the first picture, m is an integer, and $t_{r,ld}(n+1, m)$ defines a delayed removal time for preventing an underflow.

11. The method of claim 8, wherein a difference based on said second time and said first time is not less than a difference based on said fourth time and said third time.

12. The method of claim 8 further comprising: decompressing said compressed data.

13. The method of claim 8, wherein said second time less said first time is greater than or equal to said fourth time less said third time.

14. The method of claim 8, wherein said second time less said first time is greater than or equal to said fourth time less said third time less a fixed time.

15. The method of claim 8, wherein an encoder generates said compressed data and transmits said compressed data to said pre-decoder buffer so as to ensure that said difference based on said second time and said first time will not be less than said difference based on said fourth time and said third time.

16. A system comprising:

an encoder configured to generate compressed data, said compressed data including a first picture (n−1) and a subsequent second picture (n), each of said pictures including a plurality of bits starting with a first bit; and a transmitter configured to time transmission of said compressed data such that a pre-decoder buffer is capable of inputting said first bit of said first picture (n−1) at a first time and inputting said first bit of said second picture (n) at a second time, and said pre-decoder buffer is further capable of outputting said first bit of said first picture (n−1) at a third time and outputting said first bit of said second picture (n) at a fourth time; and wherein said fourth time is delayed after said third time, and wherein said second picture (n) is removed from the pre-decoder buffer at a removal time $t_r(n)$, where $t_r(n)=t_r(n-1)+t_c \times pre\_dec\_removal\_delay(n)$, where $t_r(n-1)$ is a removal time of said first picture (n−1) from the pre-decoder buffer, $t_c$ is a clock tick, and pre_dec_removal_delay(n) is a number of picture periods indicated in a syntax element present in a picture layer RBSP (Raw Byte Sequence Payload).

17. The system of claim 16, wherein said first picture (n) is removed from the pre-decoder buffer at a removal time equal to pdrd_xxx/90000, where pdrd_xxx is a pre-decoder removal delay in a buffering period SEI message.

18. The system of claim 16, wherein a third picture (n+1) enters said pre-decoder buffer after said second picture (n), and wherein said third picture (n+1) is removed from the pre-decoder buffer at a removal time $t_{r,d}(n+1)$, where $t_{r,d}(n+1,m)=t_r(0)+t_c+m$, where m is such that $t_{r,d}(n+1, m-1) < t_{af}(n+1) \leq t_{r,ld}(n+1, m)$, where $t_{af}(n+1)$ is a final arrival time of said third picture (n+1) in said pre-decoder buffer, wherein $t_r(0)$ is the removal time for the first picture, m is an integer, and $t_{r,ld}(n+1, m)$ defines a delayed removal time for preventing an underflow.

19. The system of claim 16, wherein a difference based on said second time and said first time is not less than a difference based on said fourth time and said third time.

20. The system of claim 16, wherein said second time less said first time is greater than or equal to said fourth time less said third time.

21. The system of claim 16, wherein said second time less said first time is greater than or equal to said fourth time less said third time less a fixed time.

22. An encoding method comprising:
generating compressed data including a first picture (n−1) and a subsequent second picture (n), each of said pictures including a plurality of bits starting with a first bit;
transmitting said compressed data according to a transmission timing such that a pre-decoder buffer is capable of inputting said first bit of said first picture (n−1) at a first time and inputting said first bit of said second picture (n) at a second time, and said pre-decoder buffer is further capable of outputting said first bit of said first picture (n−1) at a third time and outputting said first bit of said second picture (n) at a fourth time; and
wherein said fourth time is delayed after said third time, and wherein said second picture (n) is removed from the pre-decoder buffer at a removal time $t_r(n)$, where $t_r(n)=t_r(n-1)+t_c \times pre\_dec\_removal\_delay(n)$, where $t_r(n-1)$ is a removal time of said first picture (n−1) from the pre-decoder buffer, $t_c$ is a clock tick, and pre_dec_removal_delay(n) is a number of picture periods indicated in a syntax element present in a picture layer RBSP (Raw Byte Sequence Payload).

23. The method of claim 22, wherein said first picture (n) is removed from the pre-decoder buffer at a removal time equal to pdrd_xxx/90000, where pdrd_xxx is a pre-decoder removal delay in a buffering period SEI message.

24. The method of claim 22, wherein a third picture (n+1) enters said pre-decoder buffer after said second picture (n), and wherein said third picture (n+1) is removed from the pre-decoder buffer at a removal time $t_{r,d}(n+1)$, where $t_{r,d}(n+1,m)=t_r(0)+t_c \times m$, where m is such that $t_{r,d}(n+1, m-1) < t_{af}(n+1) \leq t_{r,ld}(n+1, m)$, where $t_{af}(n+1)$ is a final arrival time of said third picture (n+1) in said pre-decoder buffer, wherein $t_r(0)$ is the removal time for the first picture, m is an integer, and $t_{r,ld}(n+1, m)$ defines a delayed removal time for preventing an underflow.

25. The method of claim 22, wherein a difference based on said second time and said first time is not less than a difference based on said fourth time and said third time.

26. The method of claim 22, wherein said second time less said first time is greater than or equal to said fourth time less said third time.

27. The method of claim 22, wherein said second time less said first time is greater than or equal to said fourth time less said third time less a fixed time.

* * * * *